United States Patent
Ikeuchi et al.

(10) Patent No.: US 7,567,246 B2
(45) Date of Patent: Jul. 28, 2009

(54) IMAGE PROCESSING APPARATUS, IMAGE PROCESSING METHOD, AND IMAGE PROCESSING PROGRAM

(75) Inventors: Katsushi Ikeuchi, Yokohama (JP); Hiroshi Kawasaki, Saitama (JP); Ryusuke Sagawa, Mino (JP); Shuntaro Yamazaki, Tokyo (JP)

(73) Assignee: The University of Tokyo, Tokyo (JP)

( * ) Notice: Subject to any disclaimer, the term of this patent is extended or adjusted under 35 U.S.C. 154(b) by 122 days.

(21) Appl. No.: 10/602,600

(22) Filed: Jun. 25, 2003

(65) Prior Publication Data

US 2004/0150638 A1 Aug. 5, 2004

(30) Foreign Application Priority Data

Jan. 30, 2003 (JP) ............................... 2003-022317

(51) Int. Cl.
*G06T 15/00* (2006.01)
*G06T 17/20* (2006.01)
*G06T 17/00* (2006.01)
*G09G 5/00* (2006.01)

(52) U.S. Cl. ............... 345/419; 345/423; 345/424; 345/649

(58) Field of Classification Search ............... 345/419, 345/423, 424, 427, 428, 619, 649, 653, 654, 345/657, 954
See application file for complete search history.

(56) References Cited

U.S. PATENT DOCUMENTS 5,409,379 A * 4/1995 Montag et al. ............. 434/2
5,480,305 A * 1/1996 Montag et al. ............. 434/2

(Continued)

FOREIGN PATENT DOCUMENTS

EP    1271411 A2 *  1/2003
EP    1744282 A2 *  1/2007

OTHER PUBLICATIONS

Debevec, P.E.; Taylor, C.J.; Malik, J.; Levin, G.; Borshukov, G.; Yu, Y.; "Image-based modeling and rendering of architecture with interactive photogrammetry and view-dependent texture mapping", IEEE, Circuits and Systems, 1998, pp. 514-517 vol. 5.*

(Continued)

*Primary Examiner*—Kee M Tung
*Assistant Examiner*—Roberta Prendergast
(74) *Attorney, Agent, or Firm*—Oblon, Spivak, McClelland, Maier & Neustadt, P.C.

(57) ABSTRACT

This invention provides an apparatus and the like, which render an object from a predetermined view direction by a method using microfacet billboarding using 2D images obtained by photographing an object to be rendered from a plurality of photographing directions, and a depth image of the object to be rendered. This method obtains the geometrical shape of the object to be rendered on the basis of the depth image and the like, and approximates the geometrical shape using a set of microfacets whose directions change depending on the view direction. By mapping 2D images selected based on the view direction and photographing directions onto the respective microfacets as texture images, an arbitrary shaped object and landscape can be efficiently rendered.

16 Claims, 11 Drawing Sheets
(4 of 11 Drawing Sheet(s) Filed in Color)

U.S. PATENT DOCUMENTS

| | | | |
|---|---|---|---|
| 5,724,447 A * | 3/1998 | Fukushima | 382/211 |
| 5,898,438 A * | 4/1999 | Stewart et al. | 345/419 |
| 5,905,499 A * | 5/1999 | McDowall et al. | 345/419 |
| 5,936,626 A * | 8/1999 | Beasley | 345/582 |
| 6,008,813 A * | 12/1999 | Lauer et al. | 345/424 |
| 6,009,188 A * | 12/1999 | Cohen et al. | 382/154 |
| 6,009,190 A * | 12/1999 | Szeliski et al. | 382/154 |
| 6,018,348 A * | 1/2000 | Sprague | 345/421 |
| 6,023,523 A * | 2/2000 | Cohen et al. | 382/154 |
| 6,028,955 A * | 2/2000 | Cohen et al. | 382/154 |
| 6,052,123 A * | 4/2000 | Lection et al. | 345/419 |
| 6,072,497 A * | 6/2000 | Lichtenbelt et al. | 345/424 |
| 6,078,701 A * | 6/2000 | Hsu et al. | 382/294 |
| 6,118,452 A * | 9/2000 | Gannett | 345/418 |
| 6,163,320 A * | 12/2000 | Barcena et al. | 345/582 |
| 6,184,857 B1 * | 2/2001 | Latham | 345/589 |
| 6,215,496 B1 * | 4/2001 | Szeliski et al. | 345/419 |
| 6,219,061 B1 * | 4/2001 | Lauer et al. | 345/424 |
| 6,243,098 B1 * | 6/2001 | Lauer et al. | 345/424 |
| 6,246,420 B1 * | 6/2001 | Mochizuki et al. | 345/474 |
| 6,249,600 B1 * | 6/2001 | Reed et al. | 382/154 |
| 6,262,740 B1 * | 7/2001 | Lauer et al. | 345/424 |
| 6,268,846 B1 * | 7/2001 | Georgiev | 345/419 |
| 6,285,370 B1 * | 9/2001 | McDowall et al. | 345/419 |
| 6,313,841 B1 * | 11/2001 | Ogata et al. | 345/424 |
| 6,342,886 B1 * | 1/2002 | Pfister et al. | 345/424 |
| 6,373,483 B1 * | 4/2002 | Becker et al. | 345/419 |
| 6,396,496 B1 * | 5/2002 | Pfister et al. | 345/427 |
| 6,424,351 B1 * | 7/2002 | Bishop et al. | 345/582 |
| 6,424,352 B1 * | 7/2002 | Sharma et al. | 345/602 |
| 6,445,395 B1 * | 9/2002 | Barcena et al. | 345/582 |
| 6,448,968 B1 * | 9/2002 | Pfister et al. | 345/423 |
| 6,466,207 B1 * | 10/2002 | Gortler et al. | 345/427 |
| 6,480,190 B1 * | 11/2002 | Pfister et al. | 345/419 |
| 6,498,607 B1 * | 12/2002 | Pfister et al. | 345/423 |
| 6,509,902 B1 * | 1/2003 | Pfister et al. | 345/582 |
| 6,525,731 B1 * | 2/2003 | Suits et al. | 345/427 |
| 6,573,912 B1 * | 6/2003 | Suzuki et al. | 715/757 |
| 6,674,430 B1 * | 1/2004 | Kaufman et al. | 345/419 |
| 6,744,435 B2 * | 6/2004 | Zwicker et al. | 345/424 |
| 6,778,173 B2 * | 8/2004 | Han et al. | 345/420 |
| 6,864,903 B2 * | 3/2005 | Suzuki | 715/757 |
| 7,133,041 B2 * | 11/2006 | Kaufman et al. | 345/419 |
| 7,199,793 B2 * | 4/2007 | Oh et al. | 345/419 |
| 7,218,323 B1 * | 5/2007 | Halmshaw et al. | 345/424 |
| 7,272,608 B2 * | 9/2007 | Udeshi et al. | 707/100 |
| 2002/0016218 A1 * | 2/2002 | Takeda | 473/324 |
| 2002/0061131 A1 * | 5/2002 | Sawhney et al. | 382/154 |
| 2002/0165689 A1 * | 11/2002 | Callegari | 702/156 |
| 2003/0001838 A1 * | 1/2003 | Han et al. | 345/419 |
| 2003/0011596 A1 * | 1/2003 | Zhang et al. | 345/426 |
| 2003/0052878 A1 * | 3/2003 | Han et al. | 345/420 |
| 2003/0137506 A1 * | 7/2003 | Efran et al. | 345/419 |
| 2003/0214502 A1 * | 11/2003 | Park et al. | 345/420 |
| 2003/0231173 A1 * | 12/2003 | Matusik et al. | 345/419 |
| 2004/0012602 A1 * | 1/2004 | Mech | 345/581 |
| 2004/0095357 A1 * | 5/2004 | Oh et al. | 345/589 |

OTHER PUBLICATIONS

Lifeng Wang; Sing Bing Kang; Szeliski, R.; Heung-Yeung Shum; "Optimal texture map reconstruction from multiple views", Computer Vision and Pattern Recognition, 2001. Proc. of the 2001 IEEE Computer Society Conference on vol. 1, pp. I-347-I-354.*

Raskar, R.; Kok-Lim Low; "Blending multiple views", Computer Graphics and Applications, 2002. Proceedings. 10th Pacific Conference on Oct. 9-11, 2002 pp. 145-153.*

Rademacher, P. 1999. "View-dependent geometry". In Proceedings of the 26th Annual Int'l Conf. on Computer Graphics and Interactive Techniques. ACM Press/Addison-Wesley Publishing Co., New York, NY, 439-446.*

Brutzman, D., 1998, "The virtual reality modeling language and Java", Communications of the ACM, vol. 41, Issue 6, (Jun. 1998), pp. 57-64.*

P.J. Costello and S.T. Bee, "3D Model Databases: The Availability of 3D Models on the World Wide Web", Advanced VR Research Center, www.agocg.ac.uk/reports/virtual/36/36.pdf, Jun. 16, 1997, pp. 1-45.*

Curless, B. and Levoy, M., 1996, "A volumetric method for building complex models from range images", Proceedings of the 23rd Annual Conference on Computer Graphics and interactive Techniques, SIGGRAPH '96, ACM Press, NY, NY, pp. 303-312.*

X. Decoret, G. Schaufler, F. Sillion, J. Dorsey, "Multilayered imposters for accelerated rendering,", Proceedings Eurographics '99, 1999, pp. 145-156.*

Matusik, W., Buehler, C., Raskar, R., Gortler, S. J., and McMillan, L., 2000, "Image-based visual hulls", Proceedings of the 27th Annual International Conference on Computer Graphics and interactive Techniques, ACM Press/Addison-Wesley Publishing Co., NY, NY, pp. 369-374.*

McReynolds et al., "Advanced Graphics Programming Techniques Using OpenGL," Course Notes for SIGGRAPH 98, copyright © 1998, 17 pages, Internet Archive Wayback Machine, http://web.archive.org/20000919222830/http://www.sgi.com/software/opengl/advanced98/notes/.*

Narayanan, P.J.; Rander, P.W.; Kanade, T.; "Constructing virtual worlds using dense stereo", Sixth International Conference on Computer Vision, Jan. 4-7, 1998, pp. 3-10.*

Pulli, Kari Antero, "Surface reconstruction and display from range and color data", Ph.D. Dissertation, University of Washington, 1997, 125 pages.*

Saito, H.; Baba, S.; Kimura, M.; Vedula, S.; Kanade, T.; "Appearance-based virtual view generation of temporally-varying events from multi-camera images in the 3D room", Proceedings Second International Conference on 3-D Digital Imaging and Modeling, Oct. 4-8, 1999, pp. 516-525.*

Schaufler, Gernot and Wolfgang Sturzlinger, 1996, "A Three Dimensional Image Cache for Virtual Reality", In the proceedings of Eurographics (August), 11pp.*

Schaufler, Gernot. "Image-based object representation by layered impostors", In Proceedings of the ACM Symposium on Virtual Reality Software and Technology (Taipei, Taiwan, Nov. 2-5, 1998), VRST '98, ACM Press, NY, NY, pp. 99-104.*

Schaufler, Gernot. "Dynamically Generated Imposters", In MVD '95 Workshop "Modeling Virtual Worlds—Distributed Graphics", 1995, pp. 129-136.*

Shade, Jonathan et al., 1996, "Hierarchical Image Caching for Accelerated Walkthroughs of Complex Environments", In the proceedings of SIGGRAPH '96, 8pp.*

Tecchia, Franco, Celine Loscos, Yiorgos Chrysanthou, 2002, "Image-Based Crowd Rendering", Computer Graphics and Applications, IEEE, vol. 22, Isue 2, Mar.-Apr. 2002, pp. 36-43.*

Weinhaus, F. M. and Devarajan, V.; "Texture mapping 3D models of real-world scenes", ACM Computing Surveys, vol. 29, Issue 4, (Dec. 1997), pp. 325-365.*

Kawasaki et al. "Image-based rendering for mixed reality", Proceedings 2001 International Conference on Image Processing, vol. 3, Oct. 7-10, 2001, pp. 939-942.*

Sillion et al., 1997, "Efficient Imposter Manipulation for Real-Time Visualization of Urban Scenery." In the proceedings of Eurographics, (September), vol. 16, Issue 3, pp. 1-12.*

Neugebauer, P.J., "Geometrical cloning of 3D objects via simultaneous registration of multiple range images", Proceedings 1997 International Conference on Shape Modeling and Applications, Mar. 3-6, 1997, pp. 130-139.*

Amaury Aubel, Ronan Boulic and Daniel Thalmann, 1999, "Lowering the Cost of Virtual Human Rendering with Structured Animated Imposters", Computer Graphics Lab, Swiss Federal Institute of Technology (EPFL), http://wscg.zcu.cz/wscg99/papers/H7-final.ps.gz.*

Aubel A., Boulic R., Thalmann D., 1998, "Animated Impostors for Real-time Display of Numerous Virtual Human", Proceedings of Virtual Worlds '98, Paris, France, pp. 14-28.*

Cohen, et al., "Harold: a world made of drawings", Proc. of 1st international Symposium on Non-Photorealistic Animation and Rendering, Jun. 5-7, 2000, NPAR '00, ACM Press, New York, NY, pp. 83-90.*

Dobashi, et al., "A simple, efficient method for realistic animation of clouds" Proc. of 27th Annual Conference on Computer Graphics and interactive Techniques, ACM Press/Addison-Wesley Publishing Co., New York, NY, pp. 19-28, SIGGRAPH 2000.*

Maciel, et al., "Visual navigation of large environments using textured clusters", Proc. of the 1995 Symposium on interactive 3D Graphics, SI3D '95, ACM Press, New York, NY, pp. 95-98.*

Carceroni, R.L.; Kutalakos, K.N.; "Multi-view scene capture by surfel sampling: from video streams to non-rigid 3D motion, shape and reflectance", Proceedings 8th IEEE International Conference on Computer Vision, ICCV 2001, vol. 2, Jul. 2001, pp. 60-67.*

Mueller, K.; Shareef, N.; Jian Huang; Crawfis, R.; "High-quality splatting on rectilinear grids with efficient culling of occluded voxels", IEEE Transactions on Visualization and Computer Graphics, vol. 5, Issue 2, Apr.-Jun. 1999, pp. 116-134.*

Mueller, K. and Crawfis, R.; "Eliminating popping artifacts in sheet buffer-based splatting", Proceedings of the Conference on Visualization '98, Oct. 18-23, 1998, IEEE Visualization, IEEE Computer Society Press, pp. 239-245.*

Laur, D. and Hanrahan, P.; "Hierarchical splatting: a progressive refinement algorithm for volume rendering", Proceedings of the 18th Annual Conference on Computer Graphics and interactive Techniques, SIGGRAPH '91, ACM Press, NY, NY, pp. 285-288, SIGGRAPH 1991.*

Westover, L.; "Footprint evaluation for volume rendering", Proceedings of the 17th Annual Conference on Computer Graphics and interactive Techniques, SIGGRAPH 1990, ACM Press, NY, NY, pp. 367-376.*

Zwicker, M.; Pfister, H.; van Baar, J.; Gross, M.; "EWA spatting", IEEE Transactions on Visualization and Computer Graphics, vol. 8, Issue 3, Jul.-Sep. 2002, pp. 223-238.*

S. Yamazaki, et al., Thirteenth Eurographics Workshop on Rendering, pp. 169-179, "Microfacet Billboarding", 2002.

* cited by examiner

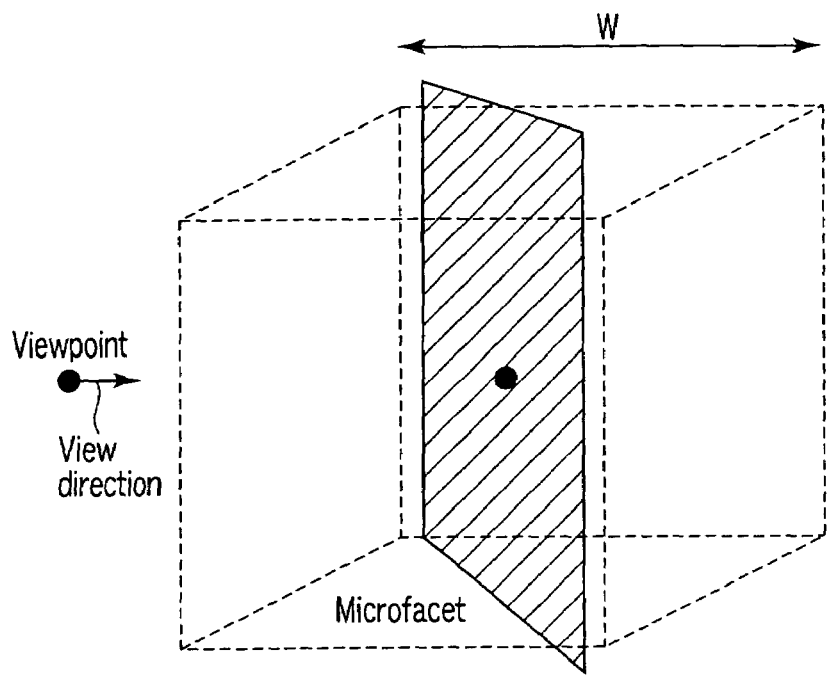
F I G. 3
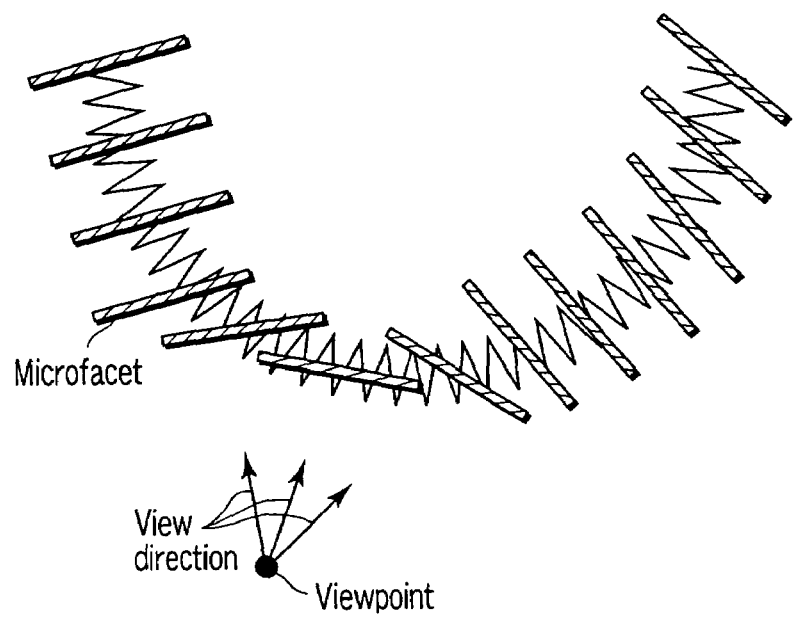
F I G. 4

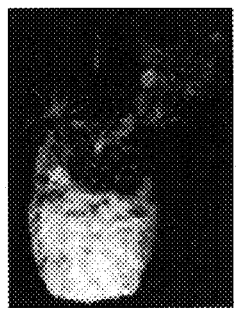 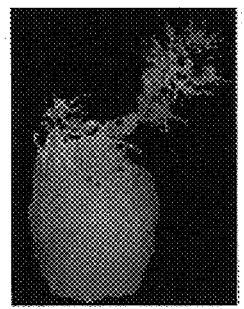 
F I G. 5A  F I G. 5B  F I G. 5C

IMAGE PROCESSING APPARATUS, IMAGE PROCESSING METHOD, AND IMAGE PROCESSING PROGRAM

CROSS-REFERENCE TO RELATED APPLICATIONS

This application is based upon and claims the benefit of priority from the prior Japanese Patent Application No. 2003-022317, filed Jan. 30, 2003, the entire contents of which are incorporated herein by reference.

BACKGROUND OF THE INVENTION

1. Field of the Invention

The present invention relates to an image processing apparatus, image processing method, and image processing program, which are used in computer graphics and the like.

2. Description of the Related Art

Reconstruction of real objects and landscapes as computer graphics is a very important process in forming a reality model such as virtual reality and augmented reality. However, it is very difficult to precisely measure or express (i.e., express as an image) an object having an intricate shape. Even if such measurement or expression is possible, the cost required for that process may become very high. To solve these problems, many studies have been conventionally made in terms of geometric models, appearance based models, and the like. However, it is still difficult to precisely measure and accurately express as an image the geometrical shape of an extremely intricate object such as the leaves of a tree, hair, and the like. Such difficulty will be discussed below.

For example, as one of the typical rendering methods in computer graphics, model based rendering (MBR) that renders on the basis of a shape model obtained by, e.g., known measurement. In this method, the shape of an object having a certain size is measured using a laser rangefinder with high precision (within the precision range of 0.1 to 10.0 mm) to generate a shape model, and a rendering process is done based on the generated model. Therefore, the accuracy of rendering in this method depends on the measurement precision of the shape model. However, in order to express a very intricate shape of hair or the like as an image, the above measurement precision is insufficient, and precise image expression cannot be implemented. In this method, the measurement precision is readily influenced by the surface characteristics of the object to be photographed, and many objects cannot even be photographed. Furthermore, a huge data size is required to precisely express an intricate geometrical shape, and it is not practicable to hold all such data.

As another typical rendering method in computer graphics, image based rendering (IBR) that renders by combining appearance from a two-dimensional (2D) image is known. Unlike MBR this method need not acquire any geometrical shape, and every landscape can be reconstructed in principle by increasing the number of input camera images. However, this method can only be used in limited situations since the cost required for photographing and that required to hold data are high. Since no geometrical shape is used, it is difficult to merge synthesized image of the object into another environment or to attain a change such as a large change in viewpoint or the like.

BRIEF SUMMARY OF THE INVENTION

The present invention has been made in consideration of the above situation, and has as its object to provide an image processing apparatus, image processing method, and image processing program, which can display an arbitrary target object by combining appearance based on an image while fully utilizing a geometrical shape obtained by measurement.

According to the first aspect of the present invention, there is provided an image processing apparatus comprising: a memory which stores a plurality of first images obtained by photographing an object to be rendered from a plurality of different photographing directions, and second images that pertains to geometry information of the object to be rendered; a geometrical shape model generation unit which generates a geometrical shape model of the object to be rendered on the basis of the second images; a microfacet generation unit which generates a plurality of microfacets used to approximate a shape of the geometrical shape model; a billboarding processing unit which rotates the plurality of microfacets to make a predetermined angle with a view direction; and a texture mapping unit which generates a third image associated with the object to be rendered in correspondence with the view direction by selecting texture images for respective microfacets from the plurality of first images on the basis of the plurality of photographing directions and view direction, and by projecting the selected texture images onto the microfacets.

According to the second aspect of the present invention, there is provided an image processing method for generating a third image from a predetermined view direction in association with an object to be rendered, comprising: generating a plurality of first images obtained by photographing the object to be rendered from a plurality of different directions, and second images that pertains to geometry information of the object to be rendered; generating a geometrical shape model of the object to be rendered on the basis of the second images; generating a plurality of microfacets used to approximate a shape of the geometrical shape model; executing a billboarding process that rotates the plurality of microfacets to make a predetermined angle with a view direction; and generating a third image by selecting texture images for respective microfacets from the plurality of first images on the basis of the plurality of photographing directions and view direction, and by projecting the selected texture images onto the microfacets.

According to the third aspect of the present invention, there is provided a computer program product configured to store program instructions for generating an image from a predetermined view direction in association with an object to be rendered using a plurality of first images obtained by photographing the object to be rendered from a plurality of different directions, and second images that pertains to geometry information of the object to be rendered, on a computer system enabling the computer system to perform functions of: generating a geometrical shape model of the object to be rendered on the basis of the second images; generating a plurality of microfacets used to approximate a shape of the geometrical shape model; executing a billboarding process that rotates the plurality of microfacets to make a predetermined angle with a view direction; and generating the third image by selecting texture images for respective microfacets from the plurality of first images on the basis of the plurality of photographing directions and view direction, and by projecting the selected texture images onto the microfacets.

BRIEF DESCRIPTION OF THE SEVERAL VIEWS OF THE DRAWING

The patent or application file contains at least one drawing executed in color. Copies of this patent or patent application publication with color drawings will be provided by the Office upon request and payment of the necessary fee.

FIG. 3 shows an example of a microfacet to be generated in a voxel;

FIG. 4 illustrates a section to be rendered upon generating microfacets in respective voxels;

FIGS. 5A to 5C are views for explaining depth clipping;

DETAILED DESCRIPTION OF THE INVENTION

Figure 1:
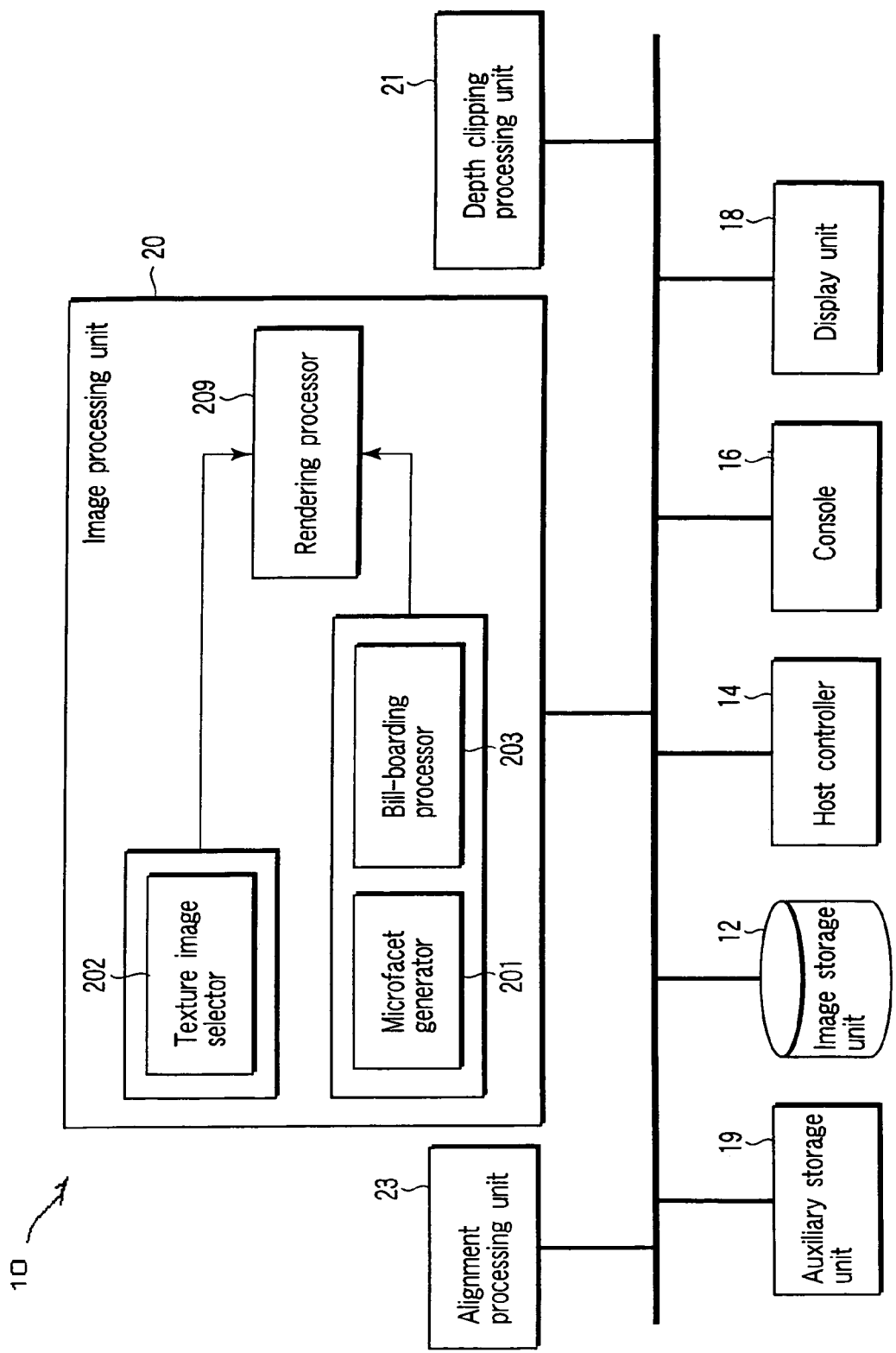
FIG. 1 is a block diagram of an image processing apparatus 10 according to an embodiment of the present invention.

An embodiment of the present invention will be described hereinafter with reference to the accompanying drawings. Note that the same reference numerals denote building components which have substantially the same functions and arrangements throughout the following description, and a repetitive description thereof will be avoided unless it is required.

FIG. 1 is a block diagram of an image processing apparatus 10 according to this embodiment. As shown in FIG. 1, the image processing apparatus 10 of this embodiment comprises a main storage unit 12, host controller 14, console 16, display unit 18, auxiliary storage unit 19, and image processing unit 20.

The main storage unit 12 is a nonvolatile memory which stores a 2D image sequence (an image sequence consisting of real images such as camera images and the like) associated with a predetermined object to be rendered, and geometrical shape information. In this embodiment, assume that the 2D image sequence includes camera images taken at a plurality of photographing positions around an object to be rendered as an object. These camera images are used as texture images in an image process (to be described later). The geometrical shape information means a depth image (an image which has distances from a sensor to an object to be rendered as pixel values of respective pixels) obtained by measurement using, e.g., a laser rangefinder or the like.

The host controller 14 makes systematic control associated with image generation, an image process, image display, data storage, communications, and the like.

The console 16 comprises a keyboard, mouse, trackball, rotary encoder, and the like, and serves as an interface at which the operator makes various input instructions to the image processing apparatus 10.

The display unit 18 comprises a CRT or the like used to display an image.

The auxiliary storage unit 19 is a removable storage medium such as a floppy disk (FD), DVD, CD-ROM, DAT, or the like.

An alignment processing unit 23 makes alignment required to express the camera images and depth images on an identical coordinate system. This alignment can adopt various methods such as a method that focuses attention on feature points, a method that focuses attention on correspondence among point groups, and the like.

The image processing unit 20 executes processes to be described later to have the camera image sequence and geometrical shape information stored in the main storage unit 12 as inputs, and renders an object to be rendered using microfacet billboarding. This image processing unit 20 has a microfacet generator 201, billboarding processor 203, texture image selector 202, and rendering processor 209 as building components that implement the respective processes.

The microfacet generator 201 generates, e.g., a voxel model associated with an object to be rendered, and generates microfacets used to approximate the geometrical shape of the object to be rendered in respective voxels.

The billboarding processor 203 rotates each microfacet in correspondence with a change in view direction so that the view direction and each microfacet always make a predetermined angle (90° in this embodiment). The mechanism of such rotation process of each microfacet is called "billboarding". Billboarding is made to cover the entire object to be rendered by the plurality of microfacets upon observing from an arbitrary view direction. Note that "view direction" means a direction when the object to be rendered is viewed from a viewpoint set in a rendering process.

The texture image selector 202 selects a texture image associated with each microfacet from the plurality of camera images on the basis of the view direction, and the photographing directions of a plurality of cameras which are used to take the camera image sequence.

The rendering processor 209 executes a rendering process by projecting each camera image selected by the texture image selector 202 onto the corresponding microfacet. Note that "photographing direction" means a direction when the object to be rendered is viewed from the photographing camera position.

A pre-processing unit 21 gives a depth information to α channel of camera images. The depth information is associated with the distance (depth) from the viewpoint for respective pixels of each camera image. This α channel information is used in a clipping process in rendering to prevent generation of double images.

A display method using microfacet billboarding, which is implemented by the image processing apparatus 10 with the above arrangement, will be described below. This method efficiently displays an arbitrarily shaped object and landscape by approximating the geometrical shape of an object to be rendered using a set of microfacets whose directions change depending on the view direction, and by mapping a 2D image as texture. According to this display method, rendering that can give perspective, and considers occlusion, the influence of a light source, and interactions with other objects can be implemented independently of the outer shape of the object to be rendered. Especially, this method is effective when the object to be rendered has an intricate outer shape (e.g., the object to be rendered is a tree or has a hairy part, and so forth).

Note that the display method can be implemented by reading out and executing a predetermined program, which is stored in the main storage unit 12, auxiliary storage unit 19, or the like, on a volatile memory, which is provided to the host controller 14 or is arranged additionally.

Figure 2:
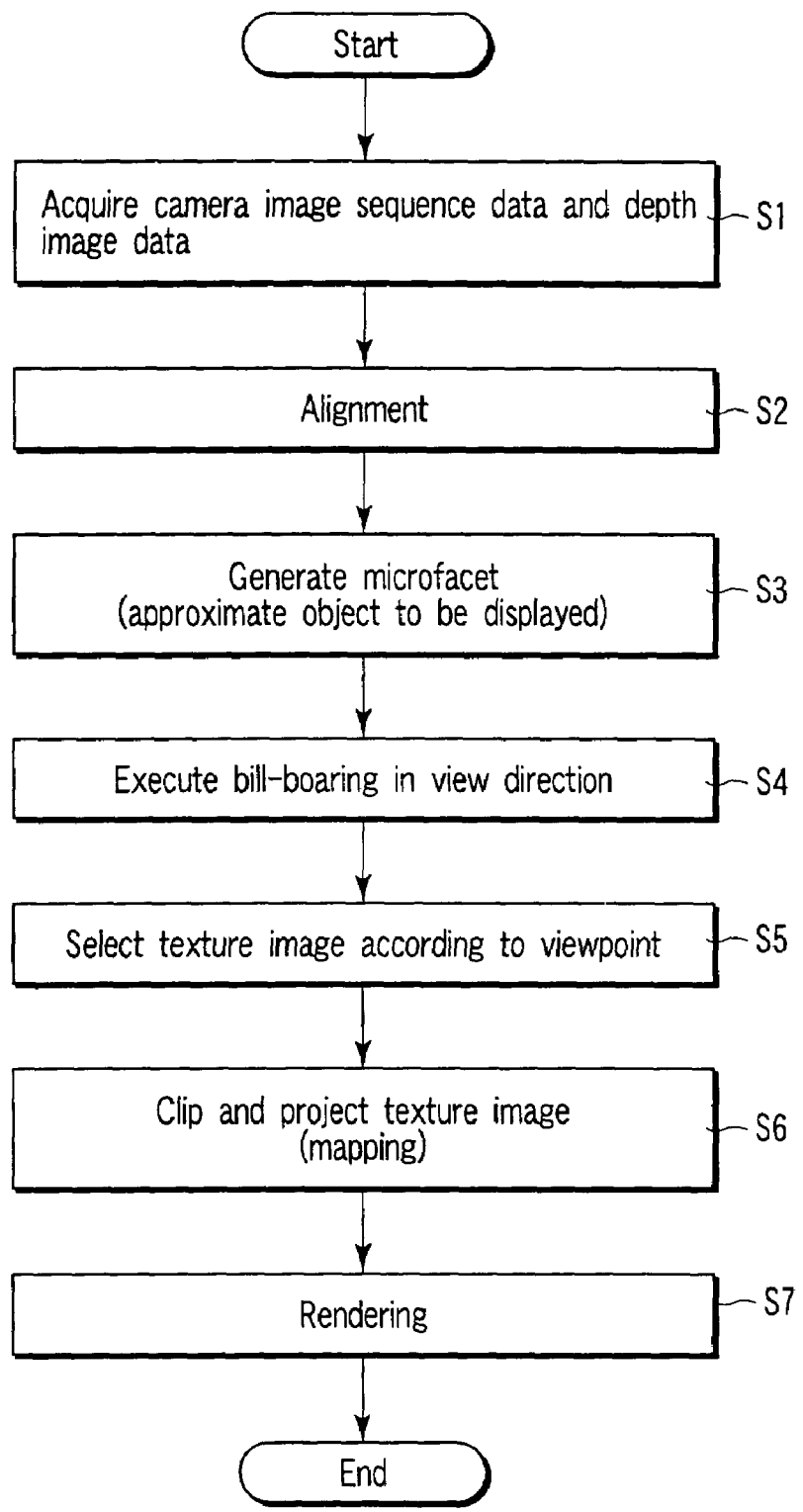
FIG. 2 is a flow chart of processes to be implemented by a generation/display method executed by the image processing apparatus 10.

FIG. 2 is a flow chart of processes implemented by the above generation/display method executed by the image processing apparatus 10. As shown in FIG. 2, camera image sequence data and depth image data are acquired (step S1). The camera image sequence data is obtained by photographing the object to be rendered from a plurality of photographing positions which are located at predetermined angular intervals to have the object to be rendered as the center. Also, the depth image data is obtained by measuring the object to be rendered using a laser rangefinder. Note that the camera images and depth images may be photographed from an identical photographing position. In this case, an alignment process that spatially aligns these images can be omitted. As geometrical shape information, a mesh model expressed by triangular patches and the like may be used in addition to the depth image.

The alignment processing unit 23 makes alignment between each camera image and depth image (step S2). In this embodiment, for example, an iterative closest part method (ICP) method or the like is adopted.

The microfacet generator 201 approximates the shape of the object to be rendered by a set of microfacets (polygons) (step S3). That is, a space is divided into microregions, and the geometrical shape obtained by measurement is re-sampled to acquire a coarse geometrical shape of the object to be rendered. To acquire this coarse geometrical shape, this embodiment adopts, e.g., a method of generating microfacets based on voxel subdivision. The detailed contents are as follows.

A volume space that completely includes the object to be rendered is set. That is, each voxel undergoes a binarization process, and if nothing is found inside the voxel, it is determined that the voxel is empty (set a voxel value "0"); if some shape is present in the voxel, a voxel value "1" is set. Subsequently, the geometrical shape is re-sampled by generating microfacets in voxels, thereby approximating the shape of the object to be rendered.

Note that the shape of a microfacet for approximation can adopt a polygonal or elliptic shape. In this embodiment, a rectangular microfacet is generated since rendering, mapping, and the like using standard graphic hardware are easy.

FIG. 3 shows an example of a microfacet to be generated in a voxel. As shown in FIG. 3, a microfacet is defined as a rectangle in each voxel. The center of a microfacet is set to match that of a voxel. This microfacet rotates within the voxel as the viewpoint moves, as will be described later. Upon this rotation, in order to cover the entire voxel by the microfacet (i.e., to allow the microfacet to completely cover the facet of the voxel when viewed from a predetermined viewpoint), the width of a microfacet must be $3^{1/2}w$ or more (w is the width of one voxel).

FIG. 4 illustrates a section to be rendered upon generating microfacets in voxels. As shown in FIG. 4, the geometrical shape of the object to be rendered is approximated by a set of microfacets.

The billboarding processor 203 rotates each microfacet to be always perpendicular to the view direction (billboarding: step S4). With this billboarding, the object to be rendered, which is completely covered by microfacets without any gaps, can be observed independently of the view direction.

The texture image selector 202 selects a camera image to be mapped as a texture image for each microfacet (step S5). If there are a plurality of cameras (if there are a plurality of camera image sequences for each camera), a camera image and a camera that takes it are dynamically determined upon rendering in accordance with variation of the viewpoint. In this embodiment, an image in which the view direction and the camera photographing direction make a smallest angle $\theta$, and completely includes a microfacet is preferentially selected.

In this method, in order to select and use an image closest to the view direction from the taken camera image sequence, an image to be selected changes as the viewpoint moves continuously. If camera images are not sufficiently dense, appearance largely changes upon changing images to be selected upon viewpoint movement, thus losing continuity and impairing reality.

To remove such drawbacks, for example, a plurality of camera images to be projected onto a microfacet are selected in ascending order of $\theta$. In order to continuously change an image upon switching selected images, interpolated images obtained by weighting and blending images before and after change are generated and used. As a result, smooth movement among camera images can be attained upon viewpoint movement, and natural rendering can be implemented.

The rendering processor 209 clips selected texture images, and perspective-projects them onto respective microfacets (mapping of texture images: step S6). In this way, rendering that can give perspective, and considers depth ordering, the influence of a light source, and interactions with other objects can be implemented independently of the outer shape of the object to be rendered (step S7).

(Depth Clipping)

In the above display method, a texture image for each microfacet is selected on the basis of the view direction and camera photographing direction. For this reason, an identical texture is often selected for a plurality of facets, and a pixel on the texture is rendered a plurality of number of times as the view direction is separated away from the photographing point. On the other hand, each pixel of a texture image represents a color information of the object to be rendered. Therefore, this multiple rendering of an identical texture appears as so-called double images, i.e., a plurality of identical objects appear, resulting in poor appearance. In order to avoid such poor appearance, the image processing apparatus of this embodiment can adopt a method called depth clipping to be described below.

Depth clipping is a method of removing double images in such a manner that geometry information (depth information) to an image object is given in advance to each pixel in a camera image, and a pixel is written on a microfacet only when that pixel of the camera image is included in a voxel upon rendering. Note that a process for giving geometry information to each pixel of in a camera image may be done as a pre-process. In this embodiment, the pre-processing unit 21 can execute the above process as, e.g., a pre-process of alignment.

FIGS. 5A to 5C are views for explaining depth clipping. The pre-processing unit 21 receives a camera image (potted plant) shown in FIG. 5A, and a corresponding depth image, and gives a depth information to each pixels' $\alpha$ channel of the camera image. FIG. 5B shows an example of an image whose $\alpha$ channel information is masked for each pixel of the camera image.

The rendering processor 209 compares the distance given to each pixel of the image shown in FIG. 5B with that to each microfacet, and determines if that pixel is necessary as a texture image. The rendering processor 209 clips and removes an unnecessary pixel. That is, let w be the generation interval of microfacets, D be the depth of the photographing direction of a microfacet on the microfacet, and d be the depth assigned to a frame. Then, the rendering processor 209 executes determination associated with clipping of a texture image in accordance with the following relation for each pixel on a camera image.

$$|d - D| < w/2$$

(render pixel on a current microfacet) (1-1)

otherwise (discard a pixel, i.e., map a transparent color) (1-2)

Figure 6:
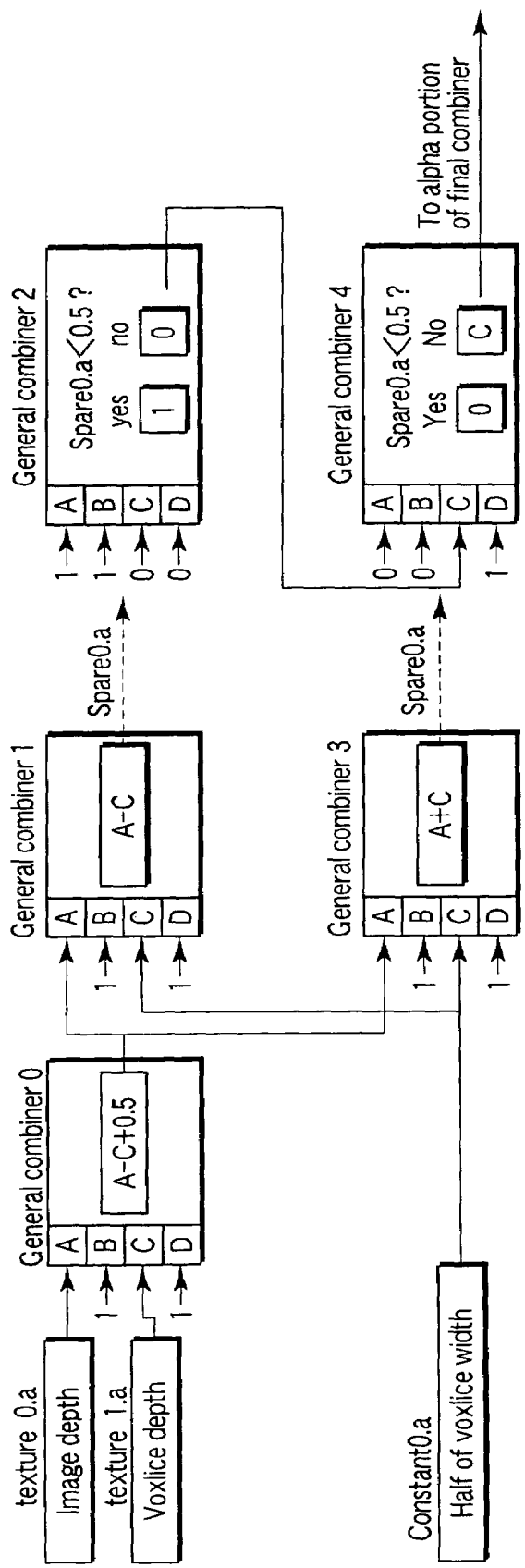
FIG. 6 is a block diagram showing an example of a hardware device which implements a texture image determination/clipping process.

Note that this determination/clipping process can be implemented by hardware using the Register Combiners (texture combining function) of the nVidia's GeForce3 graphics card (tradename). FIG. 6 shows an example of a hardware device that implements a texture image determination/clipping process. Register assignment in this device is as follows.

As shown in FIG. 6, depth image D is loaded to α-portion of texture unit 0. That is, in a camera image used as texture, color images obtained by photographing are assigned to R, G, and B channels, and depth image D obtained by projecting the geometrical shape is assigned to α channel. Then, texture pixel value d is loaded to texture unit 1. In this case, since a microfacet is expressed by a rectangular polygon, the direction of a polygon is determined based on the viewpoint position, and distances when four vertices of the rectangle are viewed in the photographing direction are assigned to these vertices as linear texture coordinates. Upon rendering each point on the microfacet, a value obtained by interpolating these texture coordinates is used as a texture pixel value. These values D and d are input to general combiner 0 as values A and C, respectively. General combiner 0 calculates an arithmetic value of A−C+0.5, and outputs that value to general combiners 1 and 3 as value A.

Then, general combiner 1 receives value A and value C=w/2 (w is the voxel size), calculates an arithmetic value of A−C, and outputs that value to general combiner 2. General combiner 2 checks if the input arithmetic value exceeds 0.5. If the input arithmetic value does not exceed 0.5, 1 is input to general combiner 4 as value C; otherwise, 0. On the other hand, general combiner 3 receives value A and value C=w/2 (w is the voxel size), calculates an arithmetic value of A+C, and outputs the value to general combiner 4.

General combiner 4 checks if each value C received from general combiners 2 and 3 exceed 0.5. If value C does not exceed 0.5, 0 is input to α-portion of a final combiner as value C; otherwise, C. This arithmetic operation corresponds to determination of relations (1-1) and (1-2). In α-portion of the final combiner, α=1 is substituted upon rendering a pixel; α=0 upon clipping a pixel, thus rendering/discarding a pixel.

Using register combiners that implement determination of relations (1-1) and (1-2), each pixel of a camera image can undergo a depth clipping process.

(Determination of Parameter Based on Error)

The density of microfacts generation largely influences image quality and rendering speed. In general, with increasing generation density, the image quality improves but the rendering speed lowers. Hence, a method of determining an optimal density of microfacts generation on the basis of a relation between the image quality and rendering speed will be described below.

In the aforementioned display method, an input camera image is projected as texture onto a microfacet. For this reason, when the viewpoint matches a given camera position, an image given by rendering matches a camera image independently of the resolution of microfacets. In this case, an image as a rendering result is free from any errors due to approximation of the geometrical shape. On the other hand, as the viewpoint is separated farther away from a given camera position, discontinuity of appearance occurs due to approximation of an originally continuous geometrical shape using a set of discontinuous microfacets.

Figure 7:
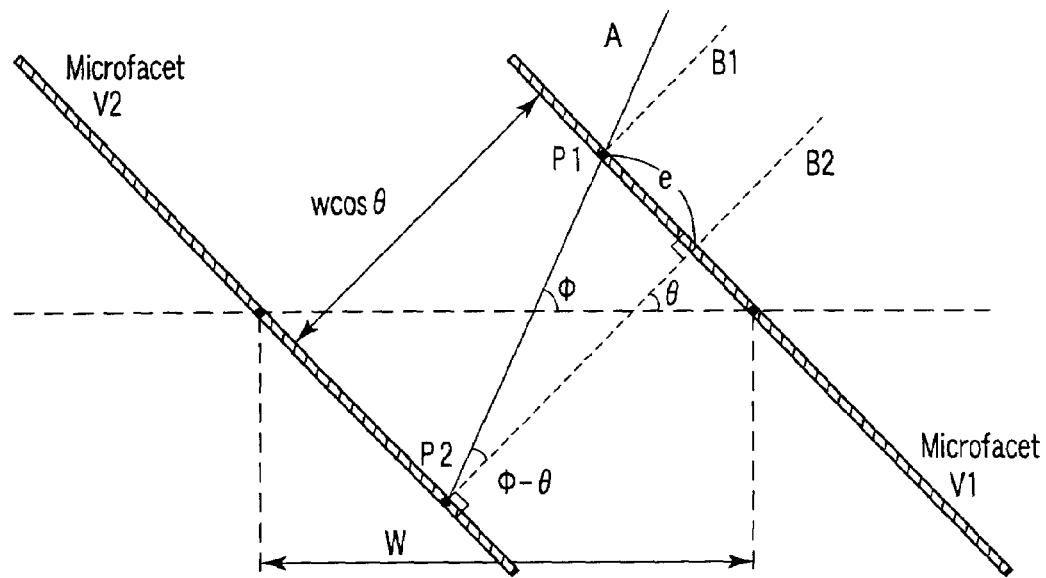
FIG. 7 is a view for geometrically explaining discontinuity of appearance.

FIG. 7 is a view for geometrically explaining discontinuity of appearance. Assume that an image, which is rendered on neighboring microfacets $v_1$ and $v_2$ upon selection of a camera in direction A, is observed from direction B. At this time, let w be the generation interval between the microfacets (the distance between the centers of the neighboring microfacets), θ be the angle of the view direction, and ϕ be the photographing direction of the camera, as shown in FIG. 7. Then, the interval between the microfacets in the view direction is given by w·cos θ. On the other hand, since points $p_1$ and $p_2$ are an identical point on the camera image, neighbors of these points are preferably continuous upon rendering. Since the microfacets are discontinuous, these points are observed to be separated by e given by:

$$e = w \cdot \cos\theta \tan|\phi - \theta| \qquad (2)$$

Upon examining δ=max|ϕ−θ| for an arbitrary input camera image sequence, since w cos θ<w, we have:

$$e < w \cdot \tan\delta \qquad (3)$$

From inequality (3), in order to suppress discontinuity of texture, it is effective to, first, decrease w, i.e., make voxel subdivision densely so as to increase the density of microfacts generation, and to, second, decrease δ, i.e., densely photograph input camera images.

However, it is often difficult to take an input camera image sequence beyond a given density, since the operation labor, data size, and the like increase. Hence, in this embodiment, the density of microfacts generation is suitably controlled by changing the number of voxel subdivisions as much as possible in correspondence with an input camera image sequence. For example, if images obtained by photographing an object to be measured from surrounding camera positions at 30° angular intervals are used as texture images, e<0.13 w holds from δ<15°. When e is considered as an error on a screen, if e<1, i.e., w<74 (unit: pixels on a screen), texture is continuously displayed. Therefore, from inequality (3), the density of microfacts generation upon movement of the viewpoint can be determined by a threshold value process.

FIGS. 8A to 8D show changes in resolution (changes in e) upon movement of the viewpoint according to inequality (3). The value e becomes smaller and the resolution becomes higher from A to D.

The size of a microfacet to be generated can be controlled by this value e, and image display optimal to observation can be implemented. As one criterion for this control, the precision of the measured geometrical shape may be used. For example if the precision of the measured geometrical shape is high, an image obtained by this method can be approximate to that obtained by MBR based on a shape model by decreasing the microfacet size. On the other hand, if the geometrical shape is unreliable, an image obtained by this method can be approximate to that obtained by IBR based on a 2D image by increasing the microfacet size.

Embodiment

An embodiment of the present invention will be described below. In this embodiment, in order to verify the effectiveness of the method of the present invention, experiments are conducted using two different camera layouts A and B (A: an object is set near the origin of a coordinate system, and is measured from surrounding positions in the direction of center, and B: a camera is set near the origin of a coordinate system, and makes measurement and photographing toward surrounding positions).

The geometric shape and camera images of an object to be rendered (an object covered by a hairy material) used in experiments are measured and photographed using the VIVID900 (tradename). In this measurement system, the camera images and geometrical shape can be measured at the same time. For this reason, the camera and object need not be aligned. Camera positions are calibrated using the alignment result of obtained point groups using a method of P. Neugebauer et. al. (e.g., Geometrical cloning of 3d objects via simultaneous registration of multiple range images. In Proc. Shape Modeling and Application '97, pages 130-139, 1997) without measuring the camera positions upon photographing. In the experiments, the object to be rendered is placed on a turntable, and is measured and photographed from surrounding 360° positions at angular intervals of 10° or more.

Figure 9A:
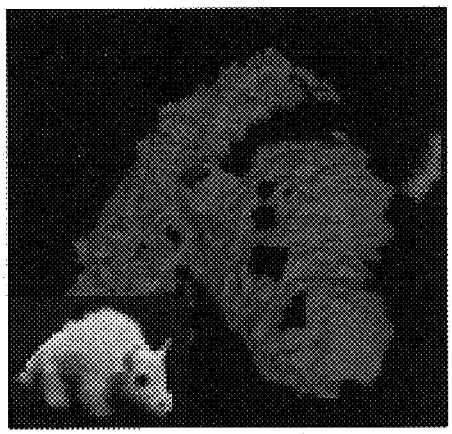
FIGS. 9A to 9E are views for explaining an embodiment of the present invention.
Figure 9B:
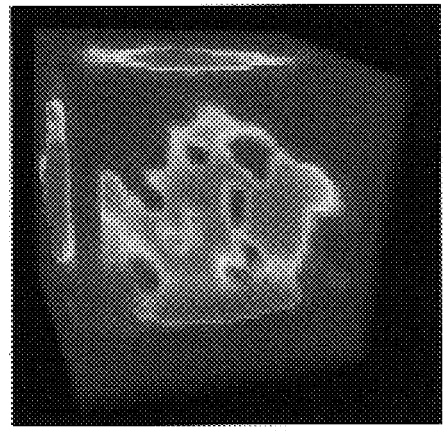

FIG. 9A shows the geometrical shape and one of camera images obtained by measurement under the situation of layout A above. Note that the object to be rendered is a stuffed toy with a hairy outer shape. When the obtained geometrical shape sequence undergoes signed distance conversion and is re-sampled in a volume space, volume data shown in FIG. 9B is obtained.

Figure 9C:
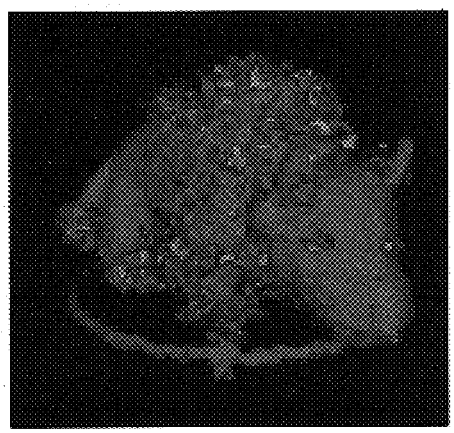

FIG. 9C shows the reconstruction result of the surface shape in accordance with the method of Wheeler et. al. (e.g., M. D. Wheeler, Y. Sato, and K. Ikeuchi, Consensus surfaces for modeling 3d objects from multiple range images. In Proc. ICCV '98, page 917-924, 1998). In this process, since the object surface is woolly, measurement is deficient, and a precise geometrical shape cannot be reconstructed.

Figure 9D:
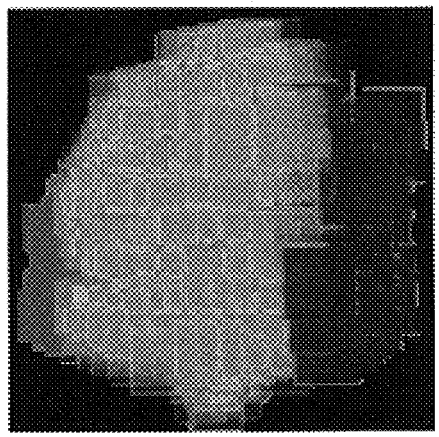
Figure 9E:
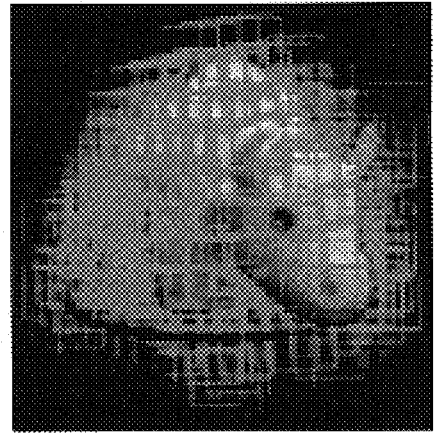

As shown in FIG. 9D, microfacets are generated based on a set of voxels each having a 64×64 size to approximate the geometrical shape. Note that the colors of the microfacets in FIG. 9D correspond to the numbers of the selected cameras. Texture mapping is executed based on the approximation result in FIG. 9D, and the mapping result is clipped according to the distances, thus obtaining the result shown in FIG. 9E. As can be seen from FIG. 9E, the method of the present invention can precisely reconstruct even an ambiguous geometrical shape portion near the object boundary.

Figure 10A:
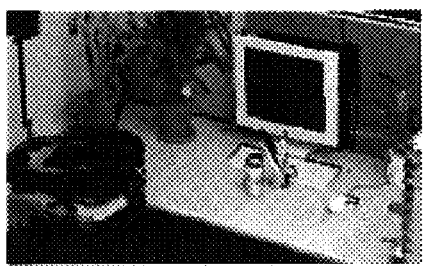
FIGS. 10A to 10D show experimental results obtained by measurement in a situation where a camera is set near the origin of a coordinate system, and makes measurement/photographing toward surrounding positions.
Figure 10B:
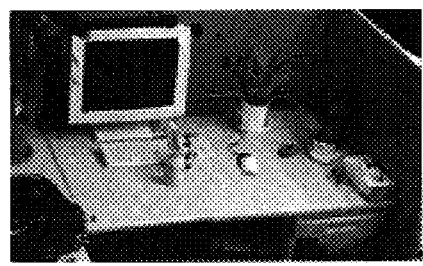
Figure 10C:
Figure 10D:
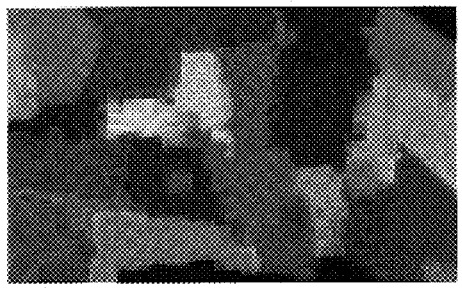

FIGS. 10A to 10D show the experiment results obtained by making measurement under the situation of layout B. Since VIVID900 used in the experiment has a narrow measurable range per measurement, the number of photos required to photograph the whole scene is 52. FIGS. 10A and 10B show the rendering results, and FIGS. 10C and 10D show camera positions selected for respective microfacets. As can be seen from FIGS. 10A to 10D, rendering that can give perspective can be implemented using the geometrical shape, but holes are formed on regions where no texture images are available due to occlusion (e.g., the upper left corner and lower left to central portions in FIG. 10C, and the lower central portion in FIG. 10D).

As a result of the above display experiments using a personal computer (PC) (Pentium III 1 GHz, main memory size: 500 Mbytes, graphics card: GeForce3, and video memory size: 64 Mbytes), the experiment results obtained in both layouts A and B can be displayed in real time at the resolution upon implementing this embodiment.

According to the above arrangement, the following effects can be obtained.

The method of the present invention can efficiently display an arbitrarily shaped object and landscape by approximating the geometrical shape of an object to be rendered using a set of microfacets whose directions change depending on the view direction, and mapping a 2D image as texture. Therefore, even when the object to be rendered such as a tree, hairy object, and the like has an intricate outer shape, rendering that can give perspective, and considers occlusion, the influence of a light source, and interactions with other objects can be implemented.

In the method of the present invention, since the geometrical shape is expressed using microfacets, the deviation width between the actual geometrical shape and microfacets becomes large depending on the microfacet size and view direction, thus producing distortion. Since texture undergoes view-dependent mapping, the sampling period influences the generated image. These points can be evaluated by the following method, and the precision can be confirmed.

Figure 11:
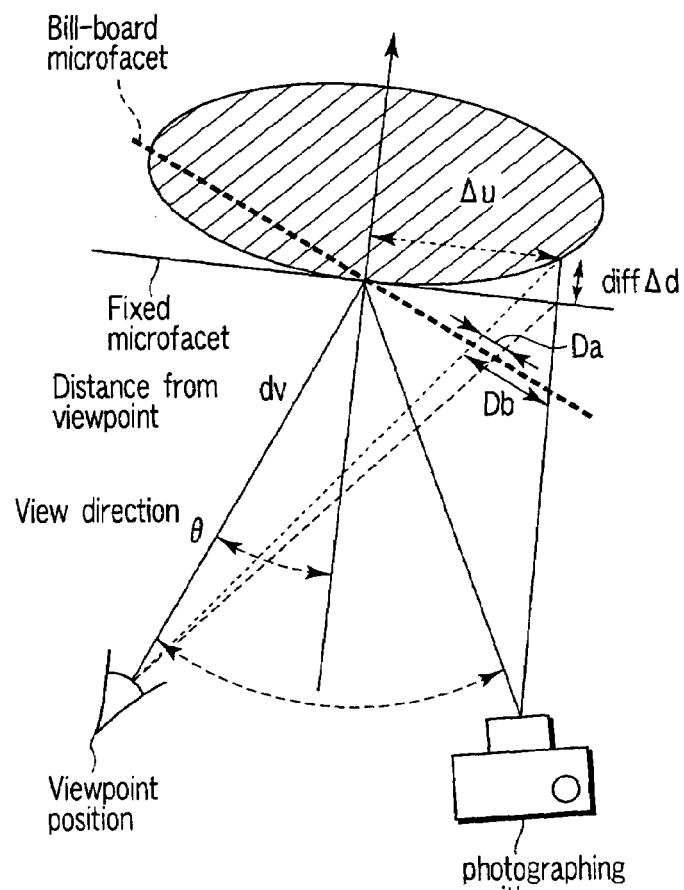
FIG. 11 is a view for explaining the effect of the embodiment of the present invention.
Figure 8A:
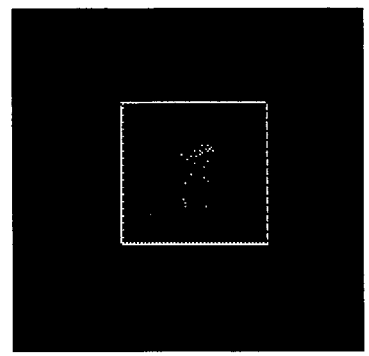
FIGS. 8A to 8D are views showing changes in resolution in correspondence with movement of a viewpoint.
Figure 8B:
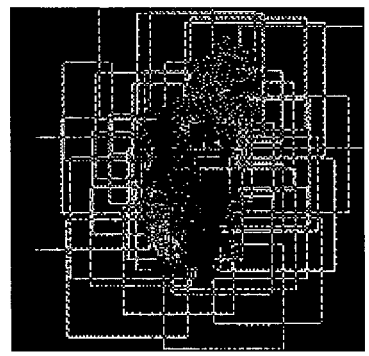
Figure 8C:
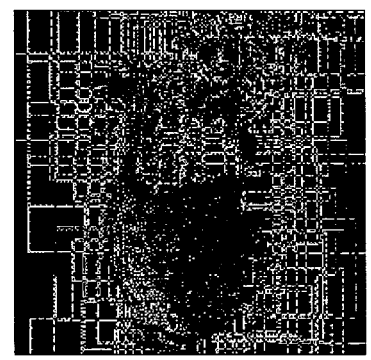
Figure 8D:

One microfacet of interest is selected, and a layout shown in FIG. 11 is examined. Using symbols in FIG. 11, the deviation (deviation width) between a pixel position at a virtual viewpoint and an actual pixel position is calculated for cases of a billboard microfacet of the method of the present invention, and a conventional fixed microfacet. A deviation width $D_a$ of the fixed microfacet, and a deviation width $D_b$ of the billboard microfacet are respectively given by:

$$D_a = \left( \frac{\Delta u - \Delta d \cdot \tan(\theta - \phi)}{1 + \tan^2\theta} - \frac{\Delta u - \Delta d \cdot \tan\theta}{1 + \tan^2\theta} \right) \frac{f}{dv} \quad (4)$$

$$D_b = \left( \frac{\Delta u - \Delta d \cdot \tan(\theta - \phi)}{1 + \tan\theta \cdot \tan(\theta - \phi)} - \frac{\Delta u - \Delta d \cdot \tan\theta}{1 + \tan^2\theta} \right) \frac{f}{dv} \quad (5)$$

where f is the focal length of the virtual viewpoint, and these equations are simplified using the fact that the viewpoint/camera position is sufficiently separated away from an object compared to the microfacet size.

As can be seen from these equations, the distortion decreases with increasing sampling period. Also, since the deviation between the geometrical shape and microfacet can be suppressed to a given threshold value or less by texture clipping according to the distances, a pixel difference generated in the current experimental environment is very small.

Upon comparing distortions of the fixed microfacet and billboard microfacet, when a change in view direction becomes large, the distortion immediately spreads on the fixed microfacet, but the distortion is stable on the billboard microfacet.

Figure 12A:
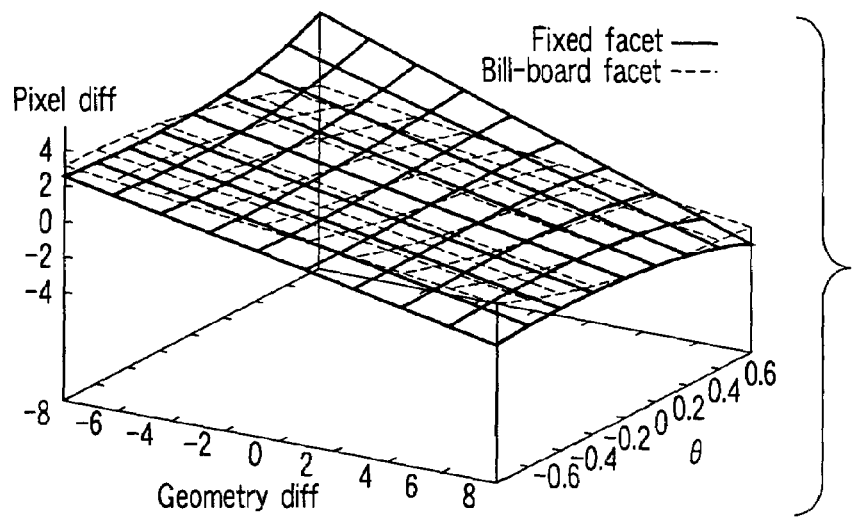
FIGS. 12A to 12C are graphs that plot equation (4)
Figure 12B:
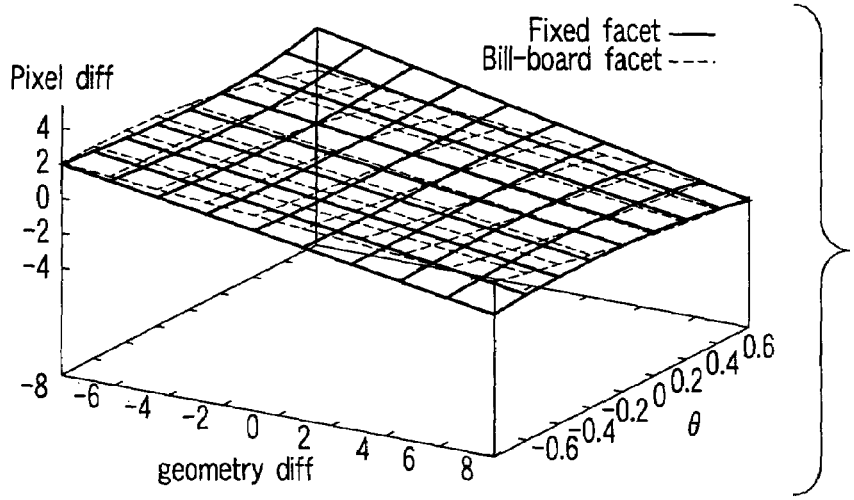
Figure 12C:
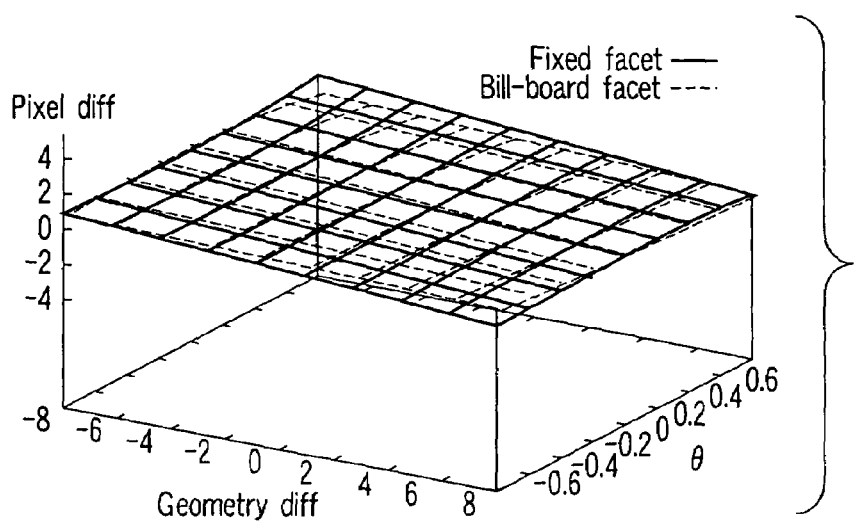
Figure 13A:
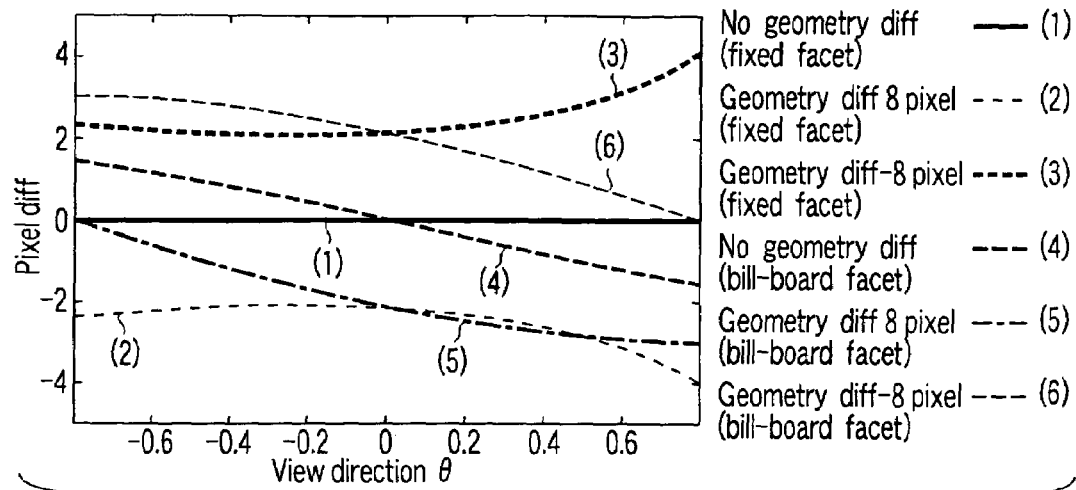
FIGS. 13A to 13C are 2D graphs obtained by mapping those in FIGS. 12A to 12C.
Figure 13B:
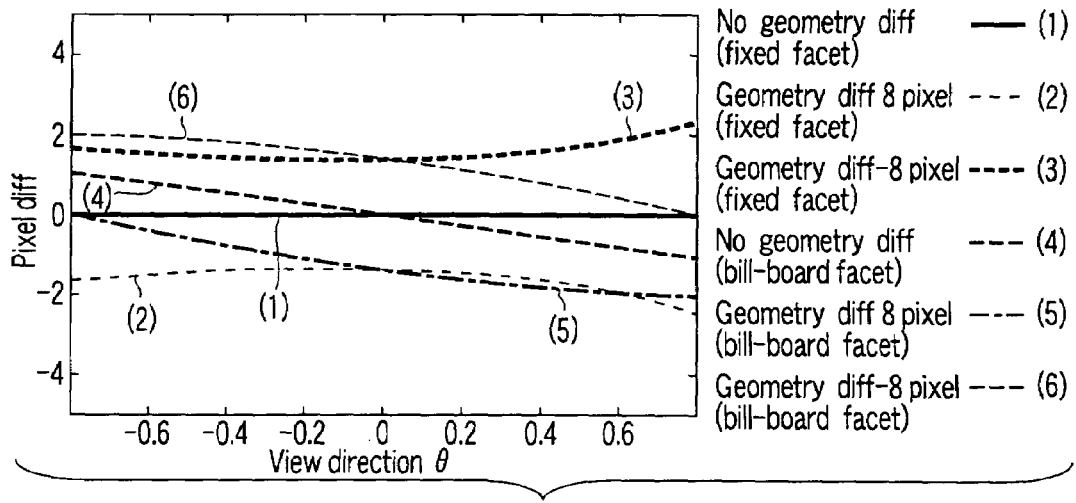
Figure 13C:
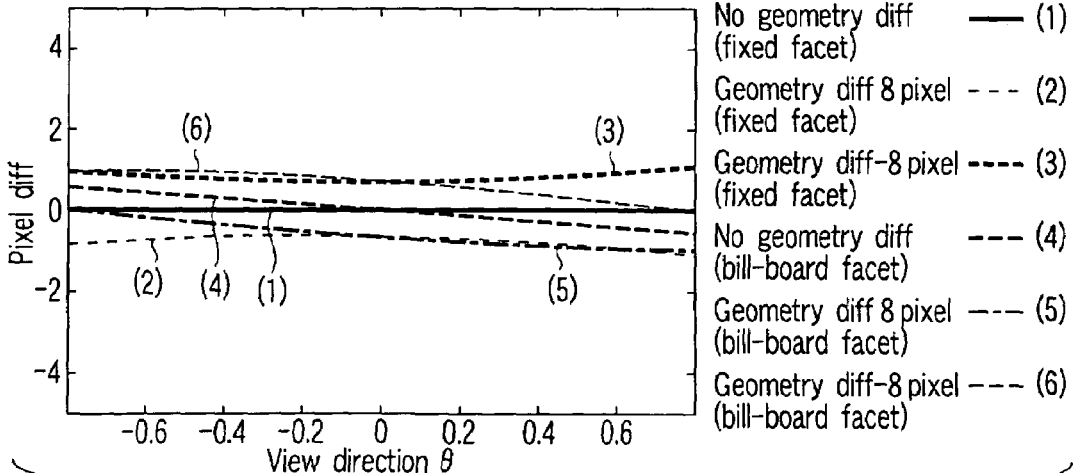

FIGS. 12A to 12C show graphs that plot equation (4) above. In this case, f=dv, and the billboard and fixed microfacets have a size of 16×16 pixels. FIGS. 13A to 13C show 2D graphs obtained by projecting the graphs in FIGS. 12A to 12C. In order to make calculations under a situation that maximizes a distortion, $\Delta u$ indicates the positions at the two ends of a microfacet, and $\phi$ is the sampling period/2.

As can be seen from FIGS. 12A to 13C, the distortion decreases with increasing sampling period. Since the deviation between the geometrical shape and microfacet can be suppressed to a given threshold value or less due to f=dv and texture clipping according to the distances, the generated pixel difference is very small. As can be seen from FIGS. 12C and 13C, upon comparing distortions of the fixed microfacet and billboard microfacet, when a change in view direction becomes large, the distortion immediately spreads on the fixed microfacet, but the distortion is stable on the billboard microfacet.

With the above evaluation results, even on a microfacet having a certain size, since a pixel difference due to deviation from the geometrical shape is small, the method of the present invention that exploits microfacet billboarding is effective for display with reality.

Also, the method of the present invention requires neither feature extraction nor background extraction of an object to be rendered, but simply uses a set of geometrical elements. Hence, precise rendering can be quickly provided by a relatively simple process. Furthermore, the method of the present invention can be easily implemented at low cost by installing a program or the like that implements this method in a normal computer graphics environment such as a personal computer, workstation, and the like.

According to the method of the present invention, camera images can be clipped in advance by a depth clipping process, and a rendering process on microfacets can be done using the clipping result. Hence, double images can be efficiently removed, and an image with good appearance can be provided. Since an extra rendering process can be excluded by the depth clipping process, the processing time can be shortened, and image provision with high realtimeness can be implemented.

In the image processing apparatus of the present invention, the depth clipping process can be efficiently implemented by graphics hardware. Hence, the load on the software configuration can be reduced, and the processing time can be shortened.

The method of the present invention can be used when the viewpoint moves around the object to be rendered and when objects to be rendered are distributed around the viewpoint. Therefore, even in an environment in which objects whose geometrical shapes can be easily acquired, and those whose geometrical shapes are hard to acquire are mixed, rendering that can give perspective, and considers occlusion, the influence of a light source, and interactions with other objects can be implemented.

As described above, according to this embodiment, an image processing apparatus, image processing method, and image processing program which can display an arbitrary target object by combining appearance based on an image while fully utilizing the geometrical shape obtained by measurement can be implemented.

What is claimed is:

1. An image processing method comprising:
   optically obtaining a plurality of first images by photographing an object to be rendered from a plurality of different directions, and optically obtaining second images that pertain to distance information of the object to be rendered;
   generating a geometrical shape model of the object to be rendered on the basis of the second images using a plurality of voxels;
   generating a plurality of microfacets as two dimensional elements that are each centered inside a voxel in a manner to approximate a three-dimensional shape of the geometrical shape model, wherein the width of each microfacet is calculated as equal to, or greater than, the square root of three times the width of each corresponding voxel;
   executing a billboarding process that rotates the plurality of microfacets to keep the plurality of microfacets substantially vertical to a view direction; and
   generating a third image by selecting texture images for respective microfacets from the plurality of first images on the basis of the plurality of photographing directions and the view direction, and by projecting the selected texture images onto the microfacets.

2. A method according to claim 1, wherein the step of generating the geometrical shape mode includes the step of controlling the number of voxels to be generated on the basis of precision of the second images.

3. A method according to claim 1, further comprising appending geometry information to each pixel of the plurality of first images on the basis of the second images, and executing a clipping process of the plurality of first images on the basis of the geometry information of each pixel of each first image and a distance from a viewpoint to each voxel.

4. A method according to claim 1, further comprising selecting at least two first images in ascending order of angle that the view direction and the plurality of photographing directions make, and generating an interpolated image on the basis of the at least two first images, and
   wherein in texture mapping, the texture images are selected for respective microfacets from the plurality of first images or the interpolated image on the basis of the plurality of photographing directions and view direction, and the selected texture images are projected onto the microfacets.

5. A method according to claim 4, further comprising appending geometry information to each pixel of the plurality of first images and the interpolated image on the basis of the second images, and executing a clipping process of the plurality of first images on the basis of the geometry information of each pixel of each first image and the interpolated image, and a distance from a viewpoint to each voxel.

6. An image processing apparatus comprising:
   an optical arrangement configured to optically obtain a plurality of first images of an object to be rendered from a plurality of different photographing directions and second images that pertain to distance information of the object to be rendered;
   a memory which stores the plurality of first images and second images;
   a geometrical shape model generation unit which generates a geometrical shape model of the object to be rendered on the basis of the second images using a plurality of voxels;
   a microfacet generation unit which generates a plurality of microfacets as two dimensional elements that are each centered inside a respective voxel in a manner to approximate a three-dimensional shape of the geometrical shape model, wherein the width of each microfacet is calculated as equal to, or greater than, the square root of three times the width of each corresponding voxel;
   a billboarding processing unit which rotates the plurality of microfacets to keep the plurality of microfacets substantially vertical to a view direction; and
   a texture mapping unit which generates a third image associated with the object to be rendered in correspondence with the view direction by selecting texture images for respective microfacets from the plurality of first images on the basis of the plurality of photographing directions and view direction, and by projecting the selected texture images onto the microfacets.

7. An apparatus according to claim 6, wherein the geometrical shape model generation unit controls the number of voxels to be generated on the basis of precision of the second images.

8. An apparatus according to claim 6, further comprising a clipping processing unit which appends geometry information to each pixel of the plurality of first images on the basis of the second images, and executes a clipping process of the plurality of first images on the basis of the geometry information of each pixel of each first image and a distance from a is viewpoint to each voxel.

9. An apparatus according to claim 6, further comprising an interpolated image generation unit which selects at least two first images in ascending order of angle that the view direction and the plurality of photographing directions make, and generates an interpolated image on the basis of the at least two first images, and wherein the texture mapping unit selects the texture images for respective microfacets from the plurality of first images or the interpolated image on the basis of the plurality of photographing directions and view direction, and projects the selected texture images onto the microfacets.

10. An apparatus according to claim 9, further comprising a clipping processing unit which appends geometry information to each pixel of the plurality of first images and the interpolated image on the basis of the second images, and executes a clipping process of the plurality of first images on the basis of the geometry information of each pixel of each first image and the interpolated image, and a distance from a viewpoint to each voxel.

11. An apparatus according to claim 8, wherein the clipping processing unit comprises graphics hardware.

12. A computer program product comprising a computer storage medium configured to store program instructions for generating a desired image from a predetermined view direction in association with an object to be rendered using a plurality of first images obtained by photographing the object to be rendered from a plurality of different directions, and optically obtained second images that pertain to distance information of the object to be rendered, on a computer system enabling the computer system to perform functions of:

generating a geometrical shape model of the object to be rendered on the basis of the second images using a plurality of voxels;

generating a plurality of microfacets as two dimensional elements that are each centered inside a respective voxel in a manner to approximate a three-dimensional shape of the geometrical shape model, wherein the width of each microfacet is calculated as equal to, or greater than, the square root of three times the width of each corresponding voxel;

executing a billboarding process that rotates the plurality of microfacets to keep the plurality of microfacets substantially vertical to a view direction; and generating the desired image by selecting texture images for respective microfacets from the plurality of first images on the basis of the plurality of photographing directions and the view direction, and by projecting the selected texture images onto the microfacets.

13. A computer program product according to claim 12, wherein the geometrical shape model generation function controls the number of voxels to be generated on the basis of precision of the second images.

14. A computer program product according to claim 12, enabling the computer system to further perform a function of appending geometry information to each pixel of the plurality of first images on the basis of the second images, and executing a clipping process of the plurality of first images on the basis of the geometry information of each pixel of each first image and a distance from a viewpoint to each voxel.

15. A computer program product according to claim 12, enabling the computer system to further perform a function of selecting at least two first images in ascending order of angle that the view direction and the plurality of photographing directions make, and of generating an interpolated image on the basis of the at least two first images, and wherein the third image generation function selects the texture images for respective microfacets from the plurality of first images or the interpolated image on the basis of the plurality of photographing directions and view direction, and projects the selected texture images onto the microfacets.

16. A computer program product according to claim 15, enabling the computer system to further perform a function of appending geometry information to each pixel of the plurality of first images and the interpolated image on the basis of the second images, and executing a clipping process of the plurality of first images on the basis of the geometry information of each pixel of each first image and the interpolated image, and a distance from a viewpoint to each voxel.

* * * * *